(12) United States Patent
Williams et al.

(10) Patent No.: US 11,510,540 B2
(45) Date of Patent: Nov. 29, 2022

(54) VACUUM CLEANER AND SYSTEM OPERABLE WITH AC AND DC POWER SOURCES

(71) Applicant: Emerson Electric Co., St. Louis, MO (US)

(72) Inventors: Matthew A. Williams, Bridgeton, MO (US); Thomas E. Fogarty, Alton, IL (US); Alex J. Wall, St. Louis, MO (US); John L. Theising, St. Peters, MO (US)

(73) Assignee: Emerson Electric Co., St. Louis, MO (US)

(*) Notice: Subject to any disclaimer, the term of this patent is extended or adjusted under 35 U.S.C. 154(b) by 791 days.

(21) Appl. No.: 16/526,029

(22) Filed: Jul. 30, 2019

(65) Prior Publication Data

US 2019/0350424 A1 Nov. 21, 2019

Related U.S. Application Data

(63) Continuation of application No. 15/620,089, filed on Jun. 12, 2017, now Pat. No. 10,413,146.

(51) Int. Cl.
*A47L 9/28* (2006.01)
*H02K 23/64* (2006.01)
(Continued)

(52) U.S. Cl.
CPC .......... *A47L 9/2878* (2013.01); *A47L 9/2831* (2013.01); *A47L 9/2842* (2013.01); *A47L 9/2884* (2013.01);
(Continued)

(58) Field of Classification Search
CPC ........ H02P 25/14; H02P 25/092; H02P 25/04; H02P 25/062; H02P 25/064; H02P 27/00; H02P 27/04; H02P 27/06; H02P 27/08; H02P 27/16; H02P 2201/00; H02P 2201/03; H02P 2201/07; H02P 2207/00; H02P 2207/05; H02P 2207/055; H02P 2207/076;
(Continued)

(56) References Cited

U.S. PATENT DOCUMENTS 2,174,652 A 10/1939 Casner
3,691,441 A 9/1972 Hasselbach et al.
(Continued)

FOREIGN PATENT DOCUMENTS

WO 2015035602 A1 3/2015
WO WO-2015035602 A1 * 3/2015 ........... A47L 9/2878

*Primary Examiner* — Antony M Paul
(74) *Attorney, Agent, or Firm* — Armstrong Teasdale LLP

(57) ABSTRACT

A vacuum cleaner includes a suction inlet, a motor, and an impeller connected to the motor and operable to generate suction through the suction inlet upon operation of the motor. The vacuum cleaner further includes a power connector mounted to the vacuum cleaner and selectively connectable to a direct current (DC) power source and an alternating current (AC) power source. The power connector includes external terminals accessible from an exterior of the vacuum cleaner. The external terminals are configured for removable mechanical connection to each of the DC power source and an AC power supply cord such that the DC power source and the AC power supply cord are selectively and mechanically connectable to the same external power connector terminals.

20 Claims, 10 Drawing Sheets

(51) Int. Cl.
*H02K 3/28* (2006.01)
*H02K 17/38* (2006.01)
*H02P 4/00* (2006.01)
*H02P 25/14* (2006.01)
*A47L 9/14* (2006.01)
*A47L 5/30* (2006.01)
*A47L 9/04* (2006.01)
*H01R 29/00* (2006.01)

(52) U.S. Cl.
CPC ............... *H02K 3/28* (2013.01); *H02K 17/38* (2013.01); *H02K 23/64* (2013.01); *H02P 4/00* (2013.01); *H02P 25/14* (2013.01); *A47L 5/30* (2013.01); *A47L 9/0411* (2013.01); *A47L 9/0477* (2013.01); *A47L 9/14* (2013.01); *A47L 9/1472* (2013.01); *A47L 9/281* (2013.01); *A47L 9/2857* (2013.01); *A47L 9/2889* (2013.01); *H01R 29/00* (2013.01)

(58) Field of Classification Search
CPC ........ H02P 2209/05; H02P 7/292; H02P 1/00; H02P 1/16; H02P 1/163; H02P 1/18; H02P 1/24; H02P 1/26; H02P 1/42; H02P 1/46; H02P 3/24; H02P 11/04; H02P 11/06; H02P 9/2878; H02P 9/2831; H02P 9/2842; H02P 9/2884; H02P 5/30; H02P 9/0411; H02P 9/14; H02P 9/1472; H02P 9/2889; H02P 9/322; H02P 9/2857
See application file for complete search history.

(56) References Cited

U.S. PATENT DOCUMENTS

| | | |
|---|---|---|
| 4,835,409 A | 5/1989 | Bhagwat et al. |
| 5,596,236 A | 1/1997 | Lee et al. |
| 6,448,732 B1 | 9/2002 | Block |
| 7,345,437 B2 | 3/2008 | Baer et al. |
| 7,653,963 B2 | 2/2010 | Cochran et al. |
| 7,696,721 B2 | 4/2010 | Young |
| 8,015,661 B2 | 9/2011 | Baer et al. |
| 8,365,350 B2 | 2/2013 | Cochran et al. |
| 8,732,896 B2 | 5/2014 | Lucas et al. |
| 10,182,694 B2 | 1/2019 | Lee et al. |
| 2016/0233810 A1 | 8/2016 | Williams et al. |
| 2016/0367092 A1 | 12/2016 | Conrad |

\* cited by examiner

VACUUM CLEANER AND SYSTEM OPERABLE WITH AC AND DC POWER SOURCES

CROSS-REFERENCE TO RELATED APPLICATIONS

This application is a continuation of U.S. patent application Ser. No. 15/620,089, filed Jun. 12, 2017, the disclosure of which is hereby incorporated by reference in its entirety.

FIELD

The field of the disclosure relates generally to vacuum cleaning systems, and more particularly, to vacuum cleaners operable to run on an alternating current (AC) power source and a direct current (DC) power source.

BACKGROUND

Vacuum cleaners commonly include a motor operable to generate suction to facilitate removal of dust and/or debris from surfaces. Power may be supplied to the motor, for example, by an alternating current (AC) source (e.g., a wall outlet) or a direct current (DC) source. At least some known vacuum cleaners are configured to operate on both an AC power source and a DC power source. For example, some vacuum cleaners include an AC power cord for connecting the vacuum cleaner to an AC power source, and a DC battery pack for supplying DC power to the vacuum cleaner.

However, at least some of these vacuum cleaners include current converting components, such as inverters or rectifiers, that condition or otherwise regulate the current supplied to the motor such that the same type of current (e.g., AC or DC) is supplied to the motor regardless of the power source connected to the vacuum cleaner. Such components generally increase the cost and complexity of manufacturing vacuum cleaners.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a vacuum cleaner includes a suction inlet, a motor, and an impeller connected to the motor and operable to generate suction through the suction inlet upon operation of the motor. The vacuum cleaner further includes a power connector mounted to the vacuum cleaner and selectively connectable to a direct current (DC) power source and an alternating current (AC) power source. The power connector includes external terminals accessible from an exterior of the vacuum cleaner. The external terminals are configured for removable mechanical connection to each of the DC power source and an AC power supply cord such that the DC power source and the AC power supply cord are selectively and mechanically connectable to the same external power connector terminals. The power connector is electrically connectable to the motor via an electrical path such that an AC current is supplied to the motor when the AC power source is connected to the power connector, and a DC current is supplied to the motor when the DC power source is connected to the power connector. The electrical path is a common electrical path that extends from the power connector to the motor such that the AC current and the DC current travel along the same electrical path from the power connector to the motor regardless of the power source connected to the power connector.

In another aspect, a vacuum cleaning system includes a suction inlet, a motor, and an impeller connected to the motor and operable to generate suction through the suction inlet upon operation of the motor. The vacuum cleaning system further includes a power connector electrically connected to the motor for supplying electrical power thereto, a direct current (DC) power source selectively connectable to the power connector, and a power supply cord having a first end that is selectively connectable to the power connector and a second end that connects to an AC power source. The power connector includes external terminals accessible from an exterior of the vacuum cleaning system. The external terminals are configured for removable mechanical connection to each of the DC power source and the first end of the power supply cord such that the DC power source and the power supply cord are selectively and mechanically connectable to the same external power connector terminals. The power connector is electrically connectable to the motor via an electrical path such that an AC current is supplied to the motor when the AC power source is connected to the power connector, and a DC current is supplied to the motor when the DC power source is connected to the power connector. The electrical path is a common electrical path that extends from the power connector to the motor such that the AC current and the DC current travel along the same electrical path from the power connector to the motor regardless of the power source connected to the power connector.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
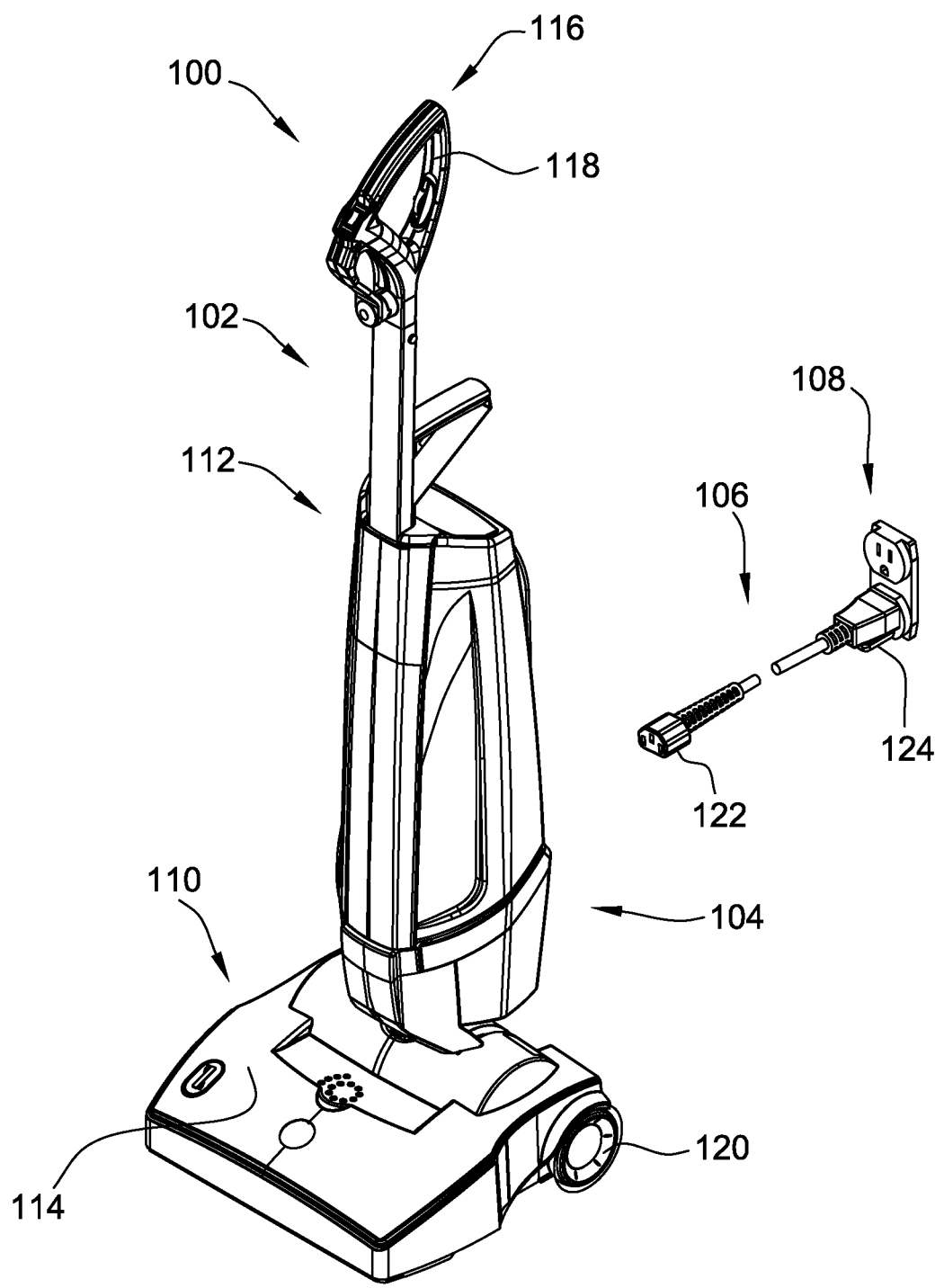
FIG. 1 is a perspective view of a vacuum cleaning system including a vacuum cleaner.

FIG. 1 is a perspective view of an example vacuum cleaning system 100 including a vacuum cleaner 102, a battery 104 (generally, a direct current (DC) power source), and a power cord 106. In the example embodiment, the vacuum cleaner 102 is an upright vacuum cleaner, although aspects of the vacuum cleaning system 100 may be embodied in vacuum cleaners other than an upright vacuum cleaner, including without limitation, wet/dry vacuum cleaners, canister vacuum cleaners, and backpack vacuum cleaners. As described further herein, the vacuum cleaner 102 is operable to run on both DC power supplied by the battery 104, and alternating current (AC) power supplied by an AC power source 108 (e.g., mains AC electricity from a household or commercial wall outlet) via the power cord 106. Accordingly, the vacuum cleaner 102 may be operated in a cordless mode, in which the battery 104 is electrically connected to the vacuum cleaner 102, and a corded mode, in which the power cord 106 is electrically connected to the vacuum cleaner 102.

In the example embodiment, the vacuum cleaner 102 generally includes a cleaning head 110 and a handle assembly 12 extending upward from and pivotally connected to the cleaning head 110. The cleaning head 110 generally includes a housing 114 that houses various components of the vacuum cleaner 102. The handle assembly 112 extends from the cleaning head 110 to a distal end 116 including a handle 118 that allows a user to maneuver and manipulate the vacuum cleaner 102. In this embodiment, the cleaning head 110 includes a plurality of rollers or wheels 120 rotatably connected to the housing 114 to facilitate moving the cleaning head 110 across a floor or other surface that is cleaned by the vacuum cleaner 102.

Figure 2:
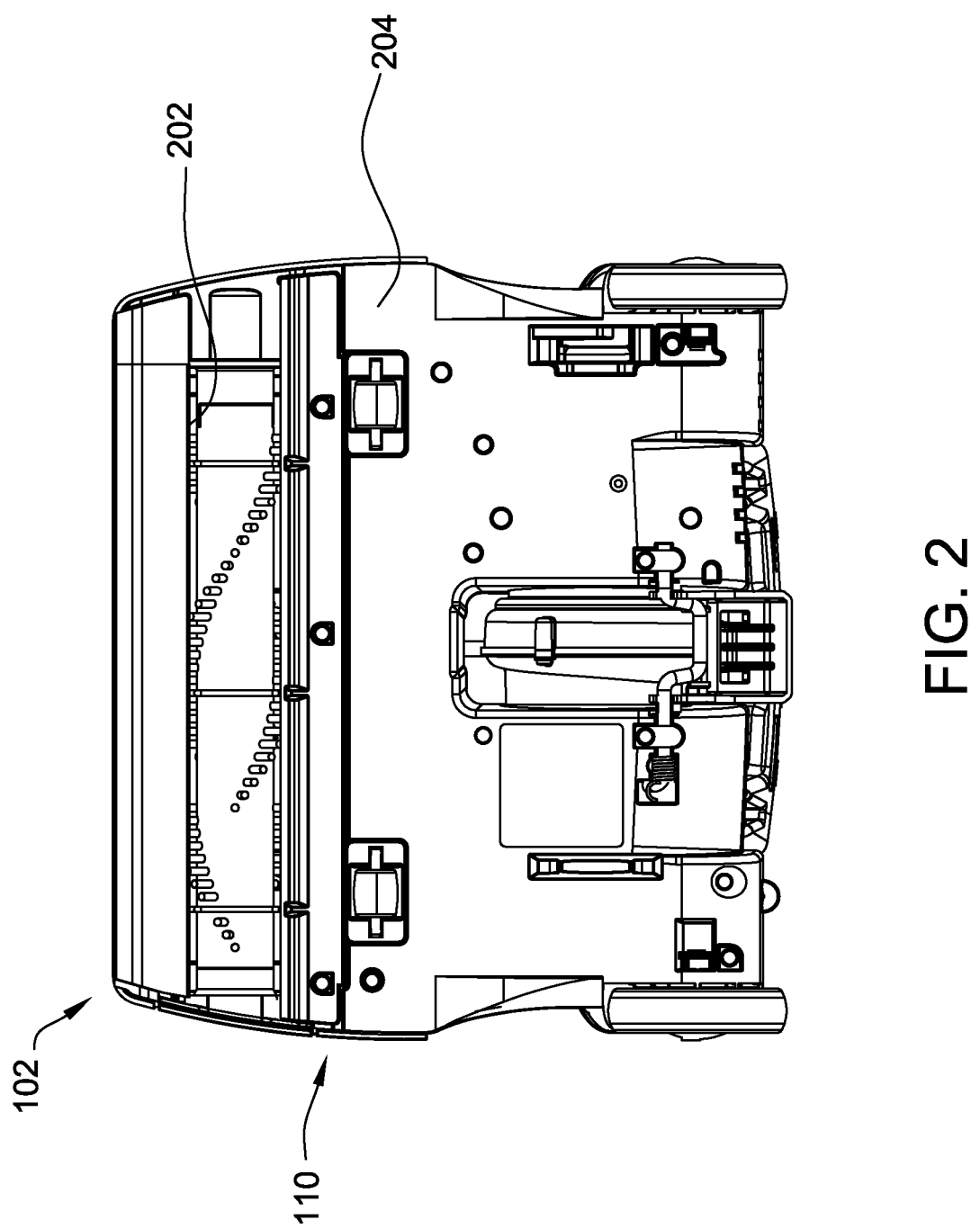
FIG. 2 is a bottom plan view of the vacuum cleaner shown in FIG. 1.

FIG. 2 is a bottom view of the vacuum cleaner 102 shown in FIG. 1. As shown in FIG. 2, the cleaning head 110 has a suction opening 202 defined along a bottom 204 thereof through which dirt, dust, and/or other debris are drawn by a vacuum force generated by the vacuum cleaner 102. The bottom 204 of the cleaning head 110 generally refers to the side or surface of the cleaning head 110 that faces and/or engages a floor or other surface that is cleaned by the vacuum cleaner 102 in operation.

Figure 3:
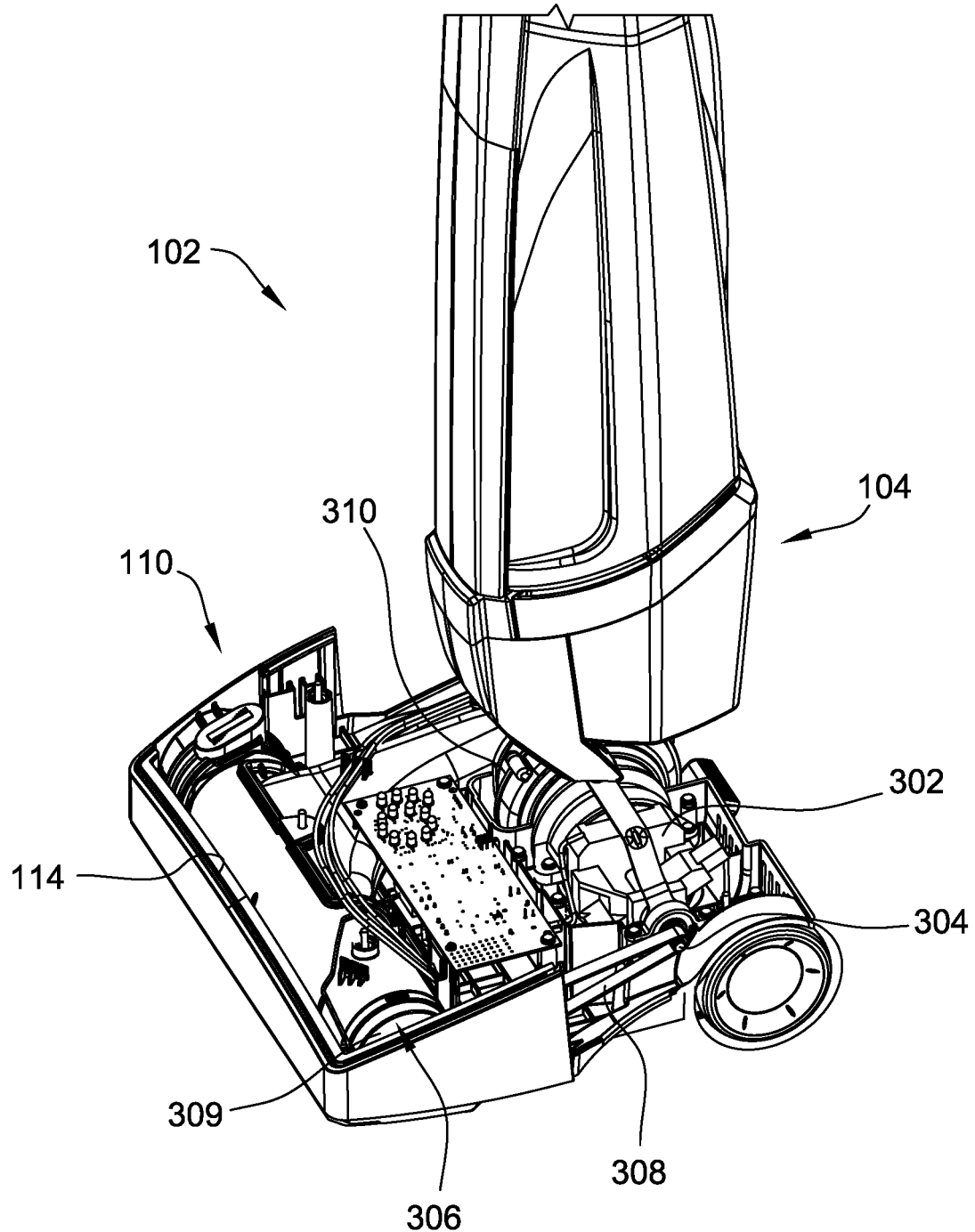
FIG. 3 is an enlarged perspective view of a portion of the vacuum cleaner shown in FIG. 1.
Figure 4:
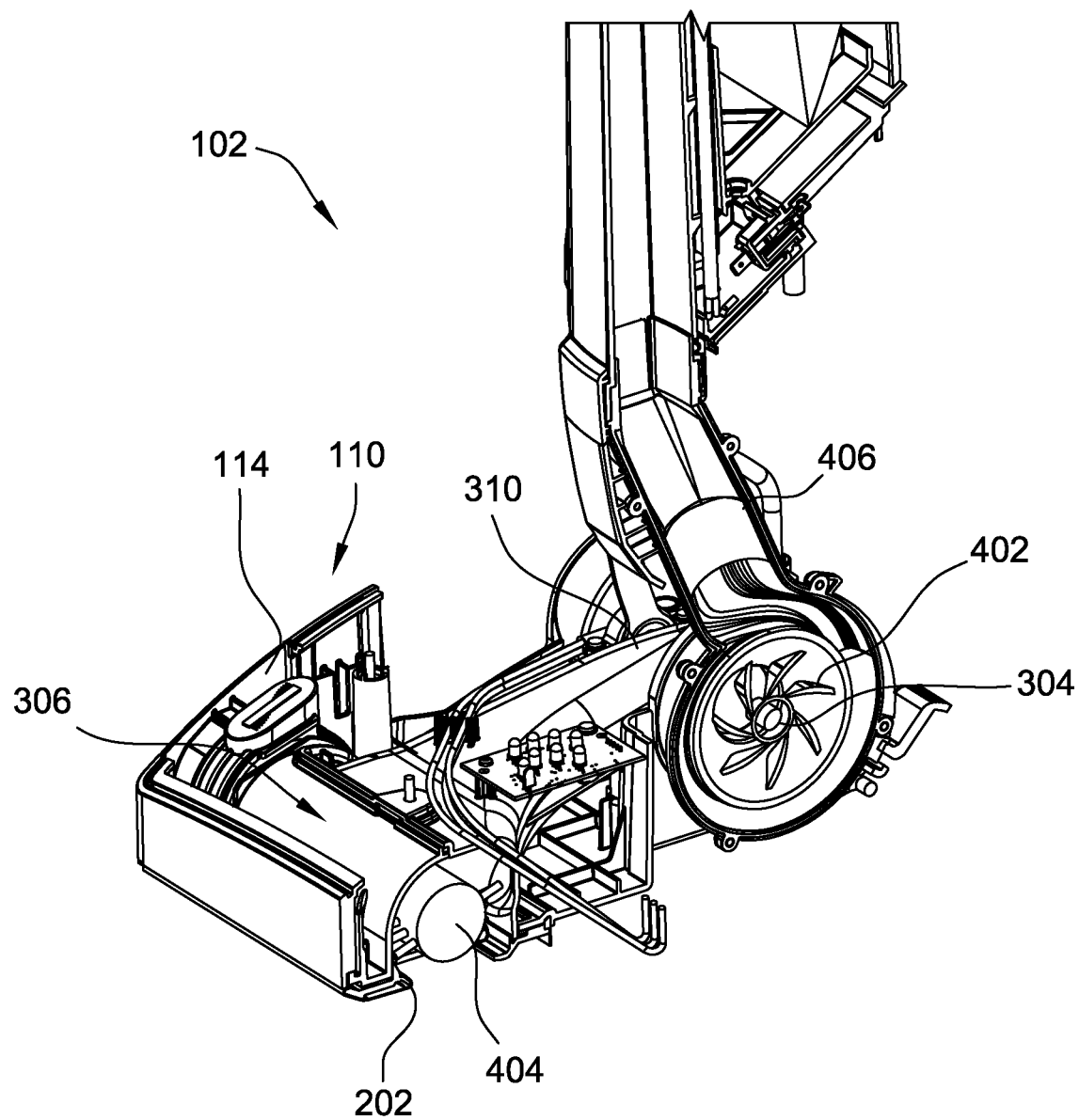
FIG. 4 is a sectional view of the portion of the vacuum cleaner shown in FIG. 3.

FIG. 3 is an enlarged perspective view of the vacuum cleaner 102 with the battery 104 connected, and FIG. 4 is a sectional view of the vacuum cleaner 102. A portion of the cleaning head housing 114 is omitted in FIGS. 3 and 4. As shown in FIGS. 3 and 4, the vacuum cleaner 102 includes a motor 302 and a blower or fan 402 (also referred to as an impeller, shown in FIG. 4) connected to the motor 302 by a motor or drive shaft 304. In this embodiment, the vacuum cleaner 102 also includes a brush unit 306 that includes a rotary brush 404 (FIG. 4) situated directly above the suction opening 202. The rotary brush 404 is operatively connected to the motor 302 by a belt 308 and pulley 309 (FIG. 3), and rotates and contacts the floor or other surface to agitate debris and promote entrainment of the debris into the airflow drawn through the suction opening 202.

The motor 302 is an electric motor that includes a plurality of stator windings and a rotor (not shown in FIGS. 3 and 4) that rotates in response to electrical current being applied to the stator windings. The rotor may include a permanent magnet and/or a plurality of rotor windings that magnetically interact with the stator windings when a current is applied to the rotor and stator windings. The drive shaft 304 is operatively connected to the rotor, and rotates in response to rotation of the rotor.

The blower 402 is housed within a blower housing 310 in fluid communication with the suction opening 202, and is operable to generate suction through the suction opening 202 upon operation of the motor 302. Air and debris pulled or drawn through the suction opening 202 are directed through a debris tube 406 (FIG. 4) extending from the blower housing 310 and upward from the cleaning head 110. The debris tube 406 is pivotally connected to the cleaning head 110, and the handle assembly 112 is pivotally connected to the cleaning head 110 by the debris tube 406. In this embodiment, the motor 302 and the blower 402 are located within the cleaning head housing 114. In other embodiments, the motor 302 and/or the blower 402 may be located at other locations along the vacuum cleaner 102, such as along or within the handle assembly 112.

Figure 5:
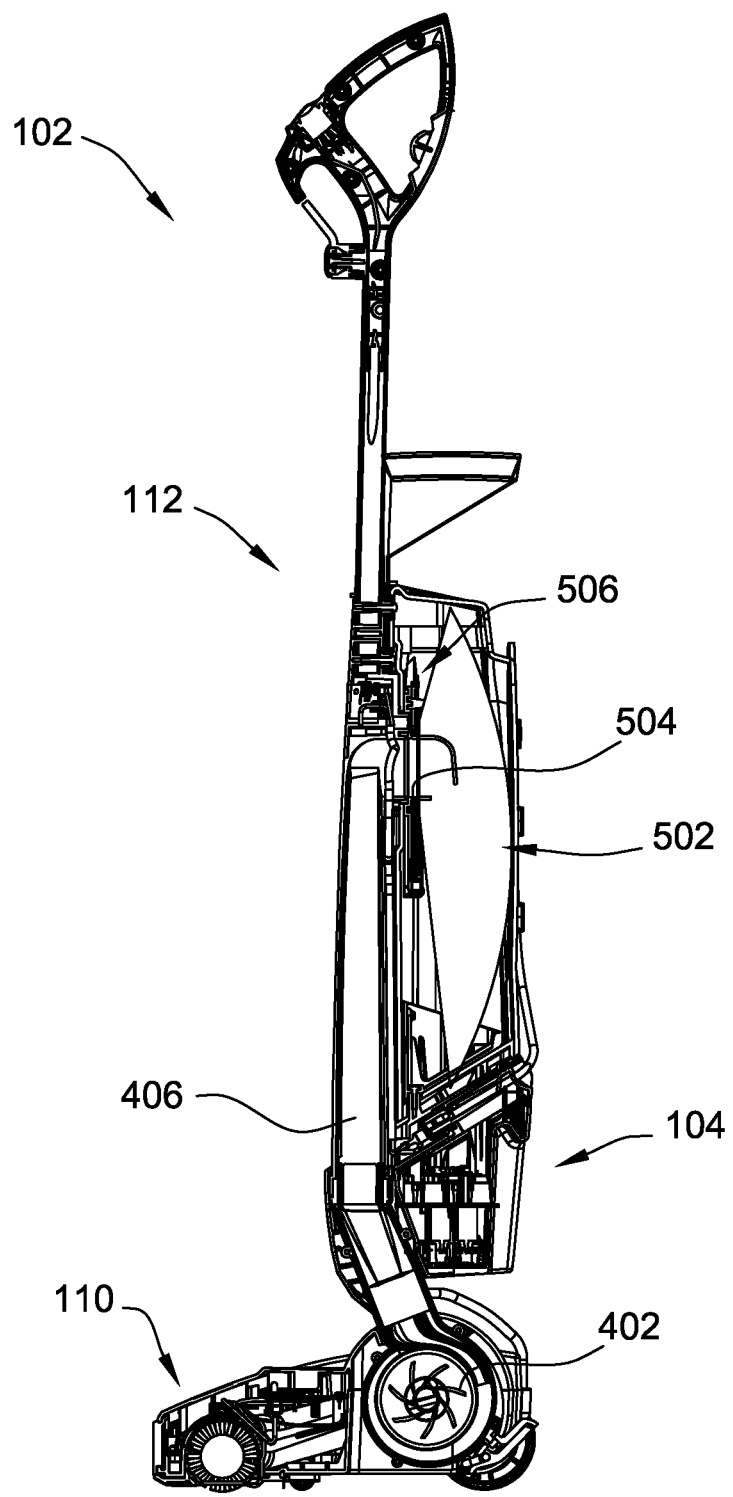
FIG. 5 is a side sectional view of the vacuum cleaner shown in FIG. 1.

As shown in FIG. 5, the vacuum cleaner 102 also includes a filter assembly 502 connected to an outlet 504 of the debris tube 406 positioned downstream from the blower 402. The filter assembly 502 filters and collects debris from the airstream flowing out of the debris tube 406. The filter assembly 502 selectively allows air to pass through the filter and retain debris within the filter assembly 502. The filter assembly 502 may include, for example and without limitation, a bag filter. In this embodiment, the vacuum cleaner 102 does not include any filters upstream of the blower 402. Thus, the blower 402 is disposed in an unfiltered or "dirty" airstream or flow path. In some embodiments, such as the embodiment shown in FIG. 5, the filter assembly 502 includes a filter switch 506 that interrupts the power supply to the motor 302 when a filter bag is not connected to the outlet 504.

Referring again to FIG. 1, the vacuum cleaner 102 is selectively connectable to the battery 104 and the power cord 106 to supply power to the vacuum cleaner 102. In this embodiment, the battery 104 is a direct current (DC) source battery. That is, the battery 104 is configured to supply direct current to the vacuum cleaner 102 when the battery 104 is connected to the vacuum cleaner 102. The battery 104 may have any suitable DC battery construction that enables the vacuum cleaner 102 to function as described herein. For example, the battery 104 may include, without limitation, a lithium-ion battery, a nickel-metal hydride battery, a lead-acid battery, a lithium-metal battery, a supercapacitor or other capacitor based voltage source, a lithium nickel manganese cobalt oxide battery, a lithium nickel cobalt aluminum oxide battery, and any other suitable DC battery construction that enables the vacuum cleaner 102 to function as described herein. In this embodiment, the battery 104 is a rechargeable lithium-ion battery. The power cord 106 includes a first end 122 that connects to vacuum cleaner 102, and a second end 124 that connects to the AC power source 108. The power cord 106 also includes a suitable electrical conduit extending from the first end 122 to the second end 124.

Figure 6:
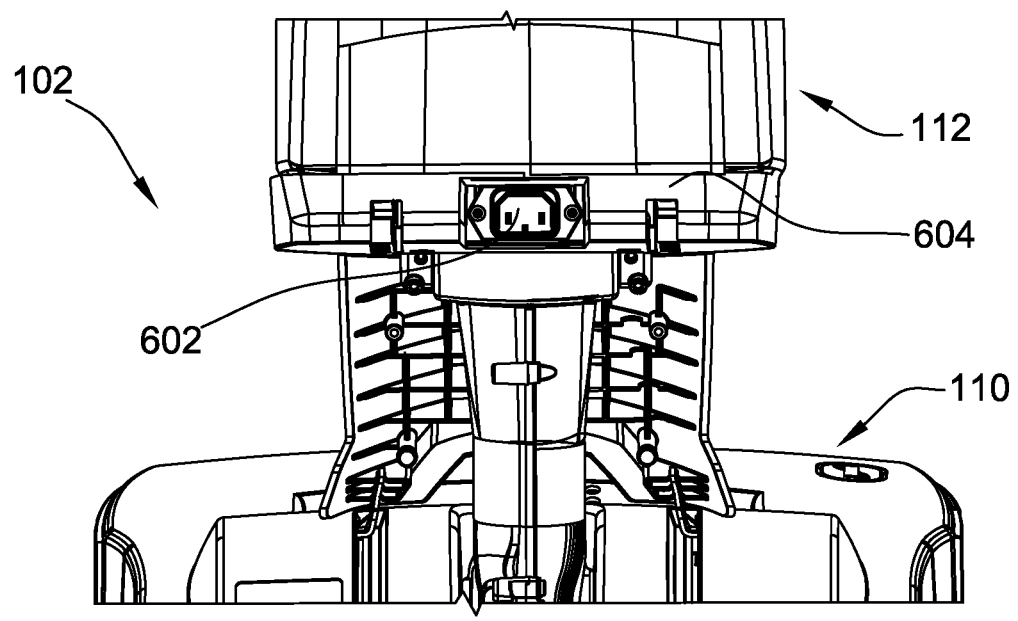
FIG. 6 is a rear view of the vacuum cleaner shown in FIG. 1.

With additional reference to FIG. 6, the vacuum cleaner 102 includes an electrical connection interface 602 for connecting a power source to the vacuum cleaner 102. The electrical connection interface 602 is selectively connectable to both the battery 104 and an AC power source 108 via the power cord 106. Specifically, the battery 104 and the power cord 106 have a common connection interface configuration that corresponds to the configuration of the electrical connection interface 602. In this embodiment, the electrical connection interface 602 includes a male IEC connector integrated into the handle assembly 112, and the battery 104 and the power cord 106 (specifically, the first end 122 of the power cord 106) each includes a female IEC connector that interconnects or mates with the male IEC connector. In other embodiments, the electrical connection interface 602 may have a configuration other than an IEC connector configuration.

Figure 7:
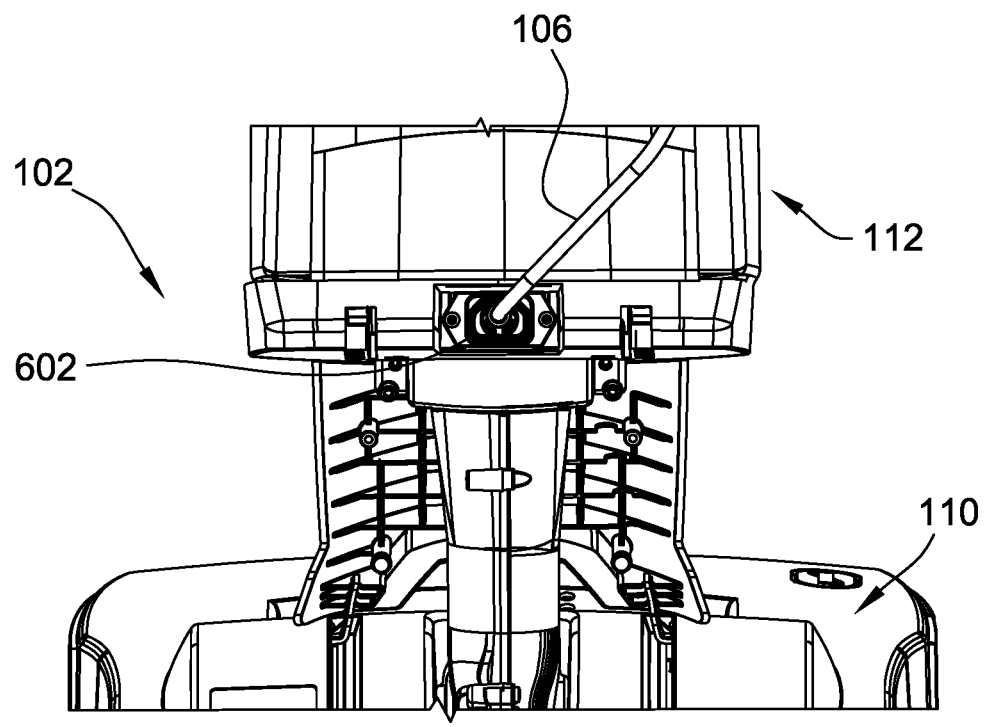
FIG. 7 is a rear view of the vacuum cleaner shown in FIG. 1 in a corded mode.
Figure 8:
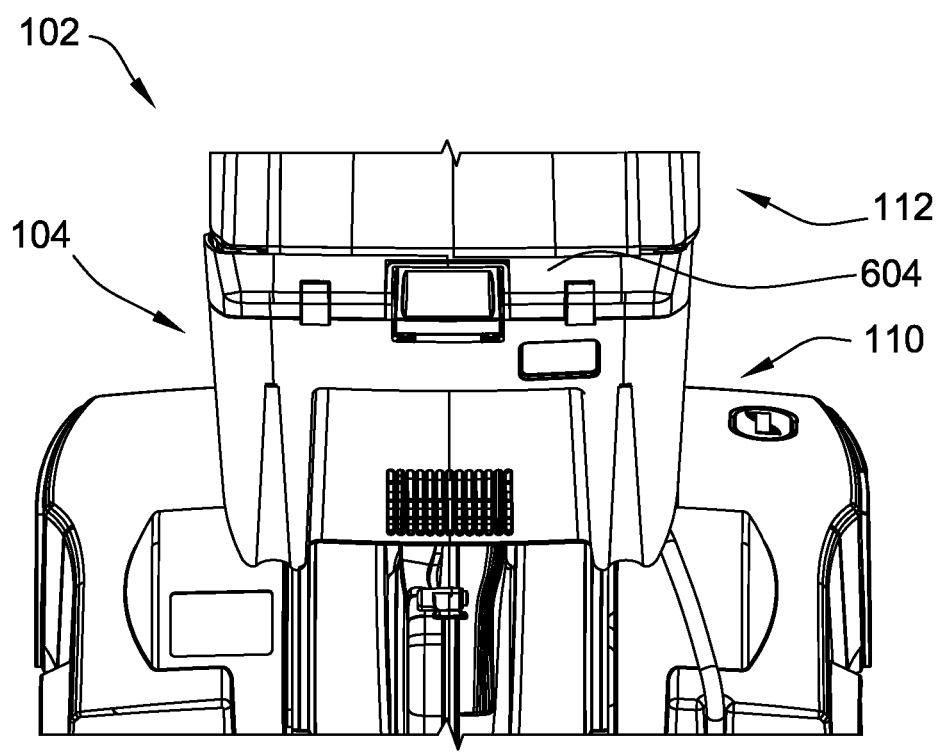
FIG. 8 is a rear view of the vacuum cleaner shown in FIG. 1 in a cordless mode.

FIG. 7 is a rear view of the vacuum cleaner 102 with the power cord 106 connected to the electrical connection interface 602, and FIG. 8 is a rear view of the vacuum cleaner 102 with the battery 104 connected to the electrical connection interface 602. As shown in FIGS. 6-8, the power cord 106 and the battery 104 connect to the same electrical connection interface 602. Thus, in this embodiment, only one of the power cord 106 and the battery 104 can be connected to the electrical connection interface 602 at a time.

In this embodiment, the battery 104 is connected directly to the electrical connection interface 602, and is secured to the vacuum cleaner 102. Further, in this embodiment, the vacuum cleaner 102 includes a battery support plate 604 connected to the handle assembly 112 and located proximate the electrical connection interface 602. The battery support plate 604 is adapted to releasably support the battery 104 on the vacuum cleaner 102 when the battery 104 is connected to the electrical connection interface 602.

Figure 9:
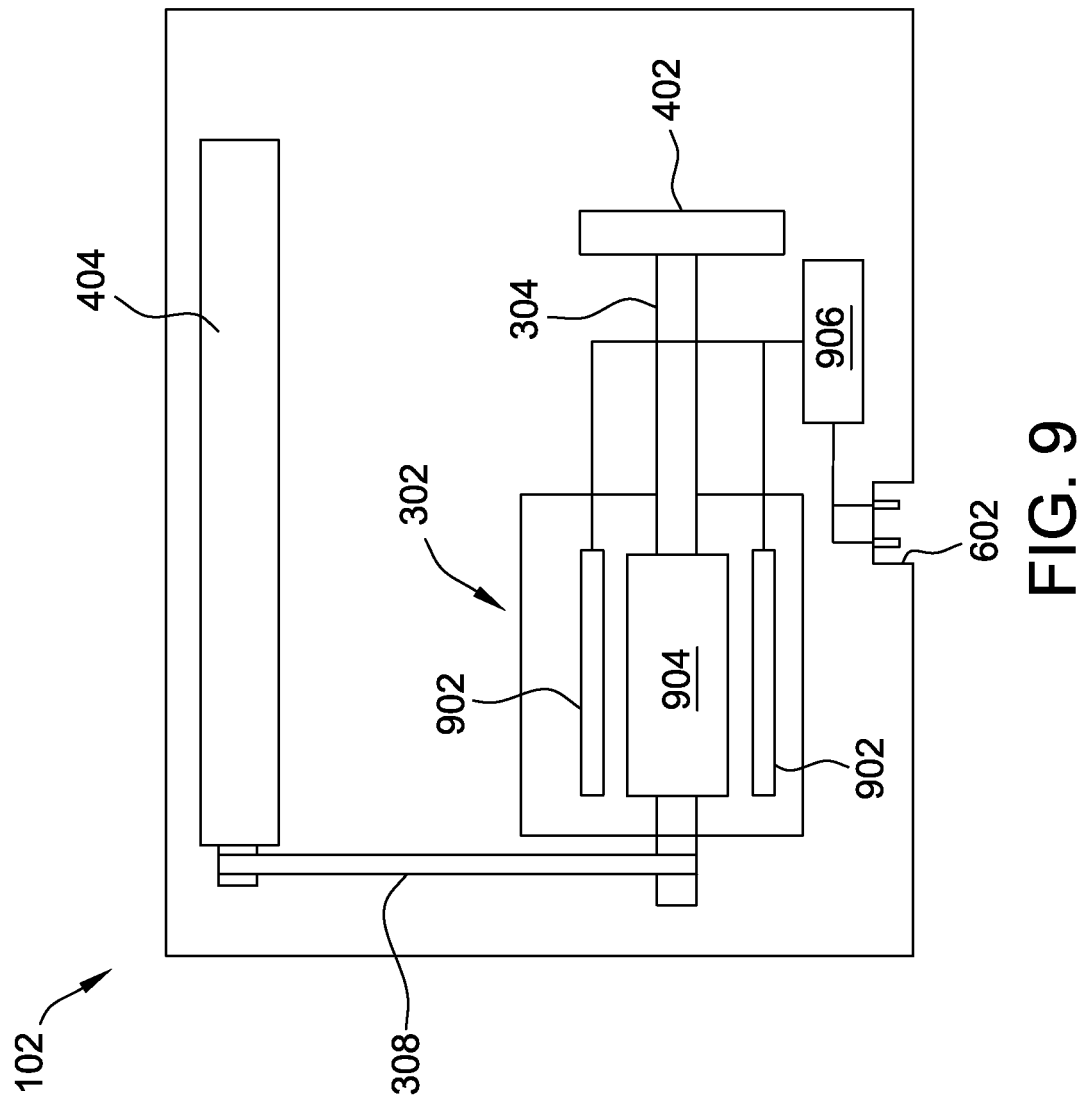
FIG. 9 is a schematic diagram of the vacuum cleaner shown in FIG. 1.
Figure 10:
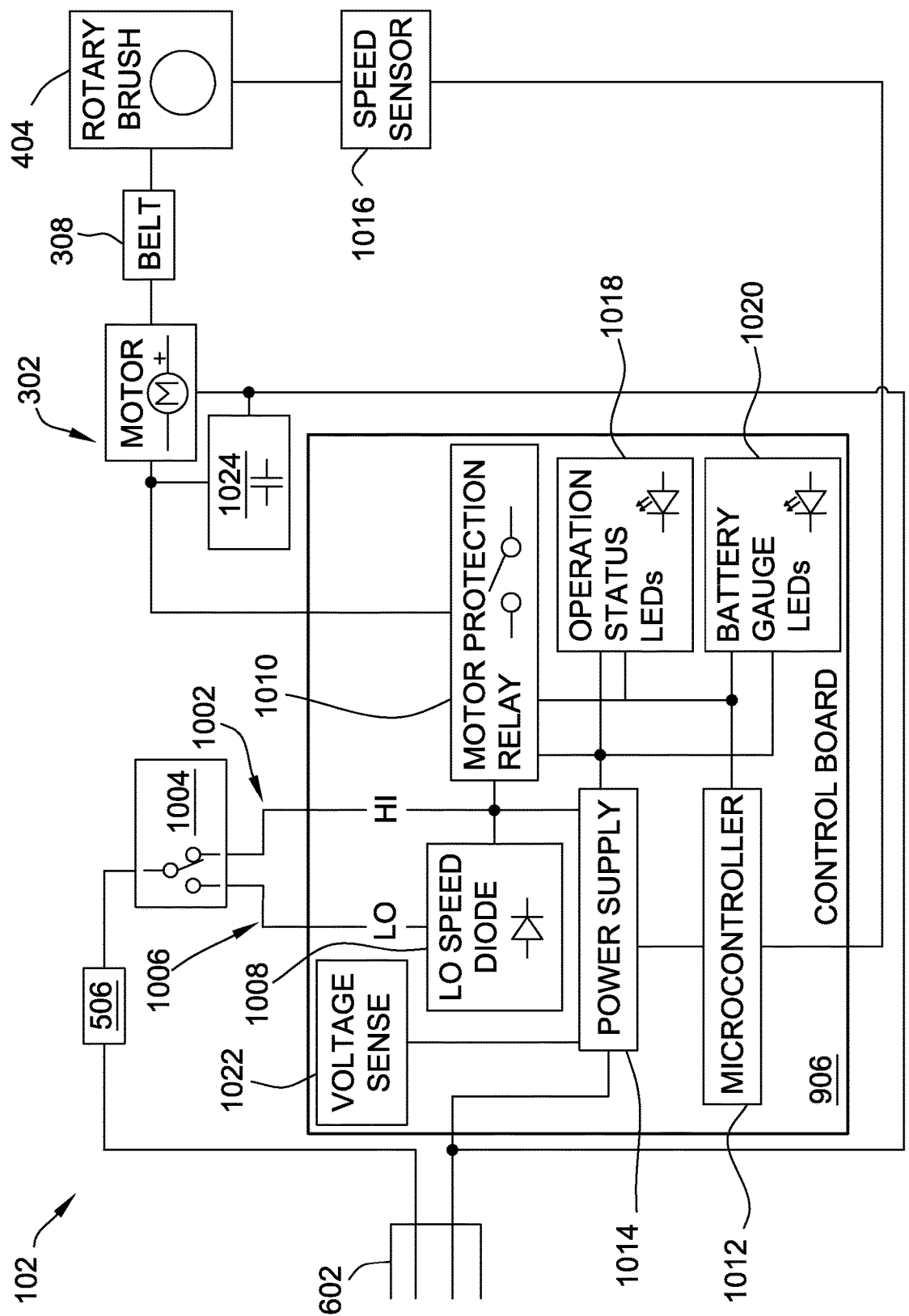
FIG. 10 is a schematic circuit diagram of the vacuum cleaner shown in FIG. 1 illustrating an electrical connection between an interface of the vacuum cleaner and a motor of the vacuum cleaner.

FIG. 9 is a schematic diagram of the vacuum cleaner 102, and FIG. 10 is a schematic circuit diagram illustrating the electrical connection between the electrical connection interface 602 and the motor 302.

As shown in FIGS. 9 and 10, the electrical connection interface 602 is electrically connected to the motor 302 to supply current to motor windings 902 (FIG. 9), which may include stator windings and/or rotor windings. When current is applied to the motor windings 902, the rotor 904 rotates, causing the drive shaft 304 to rotate, and thereby rotate the blower 402 to generate airflow through the suction opening 202 (FIG. 2).

The electrical connection interface 602 is electrically connectable to the motor 302 via at least one electrical path such that an AC current is supplied to the motor 302 when the AC power source 108 (FIG. 1) is connected to the electrical connection interface 602, and such that a DC current is supplied to the motor 302 when the battery 104 (FIG. 1) is connected to the electrical connection interface 602. For example, the electrical connection interface 602 is connectable to the motor 302 along at least one electrical path 1002 (FIG. 10) without any intervening converters, e.g., inverters (generally, DC to AC converters) or rectifiers (generally, AC to DC converters). Consequently, the type of current supplied by the power source (e.g., the battery 104 or the AC power source 108) is the same type of current applied to the motor windings 902.

Further, the electrical connection interface 602 is connectable to the motor 302 such that DC and AC currents supplied by the battery and AC power sources, respectively, travel along a common electrical path 1002 from the electrical connection interface 602 to the motor 302. Thus, when the battery 104 is connected to the electrical connection interface 602, the battery 104 applies a DC voltage across the terminals of the electrical connection interface 602, and supplies direct current to the motor 302 (specifically, the windings 902 of the motor 302) via the electrical path 1002.

When the power cord 106 is connected to the AC power source 108 and the electrical connection interface 602, an AC voltage is applied across the terminals of the electrical connection interface 602, and an AC current is supplied to the motor 302 (specifically, the windings 902 of the motor 302) via the electrical path 1002.

Thus, in contrast to at least some known vacuum cleaners, embodiments of the vacuum cleaner 102 supply current to the motor 302 along at least one electrical path along which the current is not converted or regulated to operate the motor 302 on a single type of current. Rather, embodiments of the vacuum cleaner 102 include at least one electrical path 1002 between the connection interface 602 and the motor 302 that is free of costly current converting elements, such as inverters and rectifiers, such that the motor 302 operates on the same type of current as that supplied by the power source connected to the vacuum cleaner 102.

In this embodiment, the electrical connection interface 602 is connected to the motor 302 through a power switch 1004 (FIG. 10) and a control board 906. The power switch 1004 is selectively positionable (e.g., by a user) between a plurality of switch positions that connect the connection interface 602 to the motor 302 along different electrical paths. In this embodiment, the power switch 1004 is positionable or movable between a first, high power mode position, a second, low power mode position, and an off position. In the high power mode position, the connection interface 602 is connected to the motor 302 along a first electrical path 1002 that is free of intervening converters, e.g., inverters (generally, DC to AC converters) and rectifiers (generally, AC to DC converters). Consequently, the type of current supplied to the motor 302 when the power switch is in the high power mode position corresponds to the current supplied by the power source (i.e., AC or DC). In the low power mode position, the connection interface 602 is connected to the motor 302 along a second electrical path 1006 that includes a rectifying element 1008 (e.g., a diode) that limits or governs the amount of power supplied to the motor 302 when the vacuum cleaner 102 is operating on AC power. Consequently, when the vacuum cleaner 102 is operated in the low power mode on AC power, the motor 302 and rotary brush 404 operate at a reduced speed as compared to the high power mode.

The first and second electrical paths 1002 and 1006 each extend from a first terminal of the connection interface 602, to the motor 302, and back to a second terminal of the connection interface 602. In this embodiment, the first and second electrical paths 1002 and 1006 share at least some common electrical paths. However, as noted above, the first electrical path 1002 is free of intervening converters and rectifiers between the connection interface 602 and the motor 302, whereas the second electrical path 1006 includes the rectifying element 1008 to limit or govern the amount of power supplied to the motor 302.

In this embodiment, the power switch 1004 includes three switch positions—the high power mode position, the low power mode position, and the off position. In other embodiments, the power switch 1004 may include only on and off positions such that the connection interface 602 is electrically connectable to the motor 302 via a single electrical path. In yet other embodiments, the power switch 1004 may include any suitable number of switch positions that enables the vacuum cleaner 102 to function as described herein.

In this embodiment, the control board 906 includes additional components for controlling operation of the vacuum cleaner 102 and providing operational status feedback to a user. As shown in FIG. 10, for example, the control board 906 includes a motor protection relay 1010, a microcontroller 1012, and a power supply 1014 for supplying low voltage power to the relay 1010 and the microcontroller 1012. The microcontroller 1012 is configured to actuate the motor protection relay 1010 in response to speed signals received from a speed sensor 1016 that measures a rotational speed of the rotary brush 404. In one embodiment, for example, the microcontroller 1012 actuates the relay 1010 to disconnect the motor 302 from a power supply when a detected speed of the rotary brush 404 falls below a threshold speed to protect components of the vacuum cleaner 102, such as the belt 308, from premature failure.

Additionally, in this embodiment, the control board 906 includes a plurality of operational status light emitting diodes (LEDs) 1018 and a plurality of battery gauge LEDs 1020. The operational status LEDs 1018 and the battery gauge LEDs 1020 are connected to the microcontroller 1012 and the power supply 1014. The microcontroller 1012 controls illumination of the operational status LEDs 1018 and the battery gauge LEDs 1020 based on one more operational parameters of the vacuum cleaner 102. For example, the microcontroller 1012 may control illumination of the operational status LEDs 1018 to indicate a current operating mode of the vacuum cleaner 102, the presence of an error or malfunction, that a filter bag of the vacuum cleaner 102 is full, or any other suitable status indicator that enables the vacuum cleaner 102 to function as described herein. In this embodiment, the microcontroller 1012 also controls illumination of the battery gauge LEDs 1020 to indicate a state of charge or remaining capacity of the battery 104 when the battery 104 is connected to the connection interface 602. As shown in FIG. 10, the control board 906 includes a voltage sensor 1022 to detect a state of charge of the battery 104.

In some embodiments, the vacuum cleaner 102 includes certain features to facilitate operation of the motor 302 on both AC and DC power sources. In some embodiments, for example, the motor 302 is a universal motor 302. Universal motors generally include a commutated series-wound motor in which stator field coils or windings are connected in series with rotor windings through a commutator. Universal motors are particularly well suited to operate on both AC and DC current.

Moreover, the motor 302 may have a relatively low current load rating. In some embodiments, for example, the motor 302 has a current load rating of between 2 amperes and 12 amperes at a voltage of 120 volts, between 3 amperes and 6 amperes at a voltage of 120 volts, or between 3 amperes and 5 amperes at a voltage of 120 volts. In some embodiments, the motor 302 has a current load rating of 4 amperes at a voltage of 120 volts.

Further, in some embodiments, the battery 104 has an output or operating voltage that is comparable to the average RMS voltage of mains AC electricity supplied to residential households and commercial businesses (i.e., 120 VAC). For example, the battery 104 may have a DC output voltage that is within 66% of the average RMS of mains AC voltage, within 33% of the average RMS of mains AC voltage, within 30% of the average RMS of mains AC voltage, within 25% of the average RMS of mains AC voltage, or within 20% of the average RMS of mains AC voltage. In some embodiments, for example, the battery 104 has a DC output voltage of between 50 volts DC (VDC) and 140 VDC, between 80 VDC and 140 VDC, between 90 VDC and 130 VDC, between 90 VDC and 120 VDC, between 100 VDC and 120 VDC, or between 90 VDC and 110 VDC. In this embodiment, the battery 104 has an output voltage of 92.4 VDC. Other suitable output voltages of the battery 104 include, for example and without limitation, about 80 VDC and about 108 VDC. In other embodiments, the battery 104 may have any suitable output voltage that enables the vacuum cleaner 102 to function as described herein.

Additionally, in this embodiment, the vacuum cleaner 102 includes a capacitor 1024 electrically connected in parallel with the motor 302 to inhibit or prevent electrical arcing across contacts of switches (e.g., power switch 1004) of the vacuum cleaner 102. In particular, in this embodiment, the capacitor 1024 is connected across the terminals of the motor 302 such that energy stored in the motor 302 is dissipated through the capacitor 1024 when the vacuum cleaner 102 is shut off.

Embodiments of the vacuum cleaning system 100 may have a relatively lightweight construction as compared to other upright vacuum cleaners that operate on a high voltage DC battery. In some embodiments, for example, the vacuum cleaning system 100, including the vacuum cleaner 102, the battery 104, and the power cord 106, has a combined or total weight of less than 25 pounds, less than 20 pounds, less than 18 pounds, less than 16 pounds, and even less than 14 pounds.

Embodiments of the vacuum cleaning systems and vacuum cleaners described herein achieve superior results as compared to previous vacuum cleaners. For example, embodiments of the vacuum cleaners include an electrical connection interface that is selectively connectable to both a DC power source and an AC power source, and that is electrically connectable to a motor of the vacuum cleaner along at least one electrical path such that the motor operates on the same type of current as that supplied by the power source. In embodiments of the present disclosure, the electrical connection interface is connectable to the motor along an electrical path without intervening inverters or rectifiers, thereby reducing the cost and complexity of manufacturing the vacuum cleaner as compared to vacuum cleaning systems that include costly current converting elements or circuitry. Moreover, embodiments of the vacuum cleaners described herein use a universal motor and a DC power source having an output voltage comparable to the output voltage of mains AC power to facilitate efficient operation of the motor on both AC and DC power.

Example embodiments of vacuum cleaning systems and vacuum cleaners are described above in detail. The vacuum cleaning systems and vacuum cleaners are not limited to the specific embodiments described herein, but rather, components of the vacuum cleaning systems and vacuum cleaners may be used independently and separately from other components described herein. For example, features of the vacuum cleaning systems described herein may be used with vacuum cleaners other than upright vacuum cleaners, including without limitation, wet/dry vacuum cleaners, canister vacuum cleaners, and backpack vacuum cleaners.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A vacuum cleaner comprising:
a suction inlet;
a motor;
an impeller connected to the motor and operable to generate suction through the suction inlet upon operation of the motor; and
a power connector mounted to the vacuum cleaner and selectively connectable to a direct current (DC) power source and an alternating current (AC) power source, the power connector including external terminals accessible from an exterior of the vacuum cleaner,
wherein the external terminals are configured for removable mechanical connection to each of the DC power source and an AC power supply cord such that the DC power source and the AC power supply cord are selectively and mechanically connectable to the same external power connector terminals,
wherein the power connector is electrically connectable to the motor via an electrical path such that an AC current is supplied to the motor when the AC power source is connected to the power connector, and a DC current is supplied to the motor when the DC power source is connected to the power connector, and
wherein the electrical path is a common electrical path that extends from the power connector to the motor such that the AC current and the DC current travel along the same electrical path from the power connector to the motor regardless of the power source connected to the power connector.

2. The vacuum cleaner of claim 1 further including the AC power supply cord, wherein the AC power supply cord has a first end that connects to the power connector and a second end that connects to the AC power source.

3. The vacuum cleaner of claim 1, wherein the electrical path is free of intervening inverters and rectifiers between the power connector and the motor such that AC current is supplied to the motor when the AC power source is connected to the power connector, and DC current is supplied to the motor when the DC power source is connected to the power connector.

4. The vacuum cleaner of claim 3, wherein the electrical path is a first electrical path, and wherein the power connector is selectively connectable to the motor via the first electrical path and a second electrical path by operation of a power switch, wherein the second electrical path includes a rectifying element for low speed AC operation.

5. The vacuum cleaner of claim 1, wherein the motor includes a plurality of windings, and wherein the power connector is electrically connectable to the motor via the electrical path such that the AC current is supplied to the plurality of windings when the AC power source is connected to the power connector, and the DC current is supplied to the plurality of windings when the DC power source is connected to the power connector.

6. The vacuum cleaner of claim 1 in combination with the DC power source, wherein the DC power source has a DC output voltage of between 50 volts and 140 volts.

7. The vacuum cleaner of claim 1, wherein the motor is a universal motor.

8. The vacuum cleaner of claim 1, wherein the motor is rated for a current load of between 2 amperes and 12 amperes at 120 volts.

9. The vacuum cleaner of claim 1, wherein the motor is a commutated series-wound motor including stator windings and rotor windings, wherein the stator windings are connected in series with the rotor windings through a single commutator.

10. The vacuum cleaner of claim 1, further comprising a power switch positionable between an off position and at least one on position to control supply of power to the motor along the electrical path.

11. The vacuum cleaner of claim 1, wherein the vacuum cleaner is one of an upright vacuum cleaner, a wet/dry vacuum cleaner, a canister vacuum cleaner, and a backpack vacuum cleaner.

12. A vacuum cleaning system comprising:
a suction inlet;
a motor;
an impeller connected to the motor and operable to generate suction through the suction inlet upon operation of the motor;
a power connector electrically connected to the motor for supplying electrical power thereto;
a direct current (DC) power source selectively connectable to the power connector; and
a power supply cord having a first end that is selectively connectable to the power connector and a second end that connects to an AC power source,
wherein the power connector includes external terminals accessible from an exterior of the vacuum cleaning system, the external terminals configured for removable mechanical connection to each of the DC power source and the first end of the power supply cord such that the DC power source and the power supply cord are selectively and mechanically connectable to the same external power connector terminals,
wherein the power connector is electrically connectable to the motor via an electrical path such that an AC current is supplied to the motor when the AC power source is connected to the power connector, and a DC current is supplied to the motor when the DC power source is connected to the power connector,
wherein the electrical path is a common electrical path that extends from the power connector to the motor such that the AC current and the DC current travel along the same electrical path from the power connector to the motor regardless of the power source connected to the power connector.

13. The vacuum cleaning system of claim 12, wherein the electrical path is free of intervening inverters and rectifiers between the power connector and the motor such that AC current is supplied to the motor when the AC power source is connected to the power connector, and DC current is supplied to the motor when the DC power source is connected to the power connector.

14. The vacuum cleaning system of claim 13, wherein the electrical path is a first electrical path, and wherein the power connector is selectively connectable to the motor via the first electrical path and a second electrical path by operation of a power switch, wherein the second electrical path includes a rectifying element for low speed AC operation.

15. The vacuum cleaning system of claim 12, wherein the motor includes a plurality of windings, and wherein the power connector is electrically connectable to the motor via the electrical path such that the AC current is supplied to the plurality of windings when the AC power source is connected to the power connector, and the DC current is supplied to the plurality of windings when the DC power source is connected to the power connector.

16. The vacuum cleaning system of claim 12, wherein the DC power source has a DC output voltage of between 50 volts and 140 volts.

17. The vacuum cleaning system of claim 12, wherein the motor is a universal motor.

18. The vacuum cleaning system of claim 12, wherein the motor is a commutated series-wound motor including stator windings and rotor windings, wherein the stator windings are connected in series with the rotor windings through a single commutator.

19. The vacuum cleaning system of claim 12, further comprising a power switch positionable between an off position and at least one on position to control supply of power to the motor along the electrical path.

20. The vacuum cleaning system of claim 12, wherein the vacuum cleaning system is one of an upright vacuum cleaner, a wet/dry vacuum cleaner, a canister vacuum cleaner, and a backpack vacuum cleaner.

\* \* \* \* \*